US012033391B2

(12) United States Patent
Singh et al.

(10) Patent No.: US 12,033,391 B2
(45) Date of Patent: Jul. 9, 2024

(54) SYSTEMS AND METHODS FOR DETECTING DEEP NEURAL NETWORK INFERENCE QUALITY USING IMAGE/DATA MANIPULATION WITHOUT GROUND TRUTH INFORMATION

(71) Applicant: Ford Global Technologies, LLC, Dearborn, MI (US)

(72) Inventors: Gurjeet Singh, Castro Valley, CA (US); Apurbaa Mallik, Santa Clara, CA (US); Zafar Iqbal, Hayward, CA (US); Hitha Revalla, San Jose, CA (US); Steven Chao, San Francisco, CA (US); Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 17/547,495

(22) Filed: Dec. 10, 2021

(65) Prior Publication Data

US 2023/0186637 A1    Jun. 15, 2023

(51) Int. Cl.
  *G06V 20/56* (2022.01)
  *G06F 18/23* (2023.01)
  *G06N 3/02* (2006.01)
  *G06N 5/04* (2023.01)

(52) U.S. Cl.
  CPC .............. *G06V 20/56* (2022.01); *G06F 18/23* (2023.01); *G06N 3/02* (2013.01); *G06N 5/04* (2013.01)

(58) Field of Classification Search
  CPC ..... G06V 20/56–597; G06V 10/70–87; G06N 3/02–126; G06N 5/04–048
  See application file for complete search history.

(56) References Cited

U.S. PATENT DOCUMENTS

| 6,834,120 B1* | 12/2004 | LeClerc ............... G06V 10/758 345/694 |
| 9,275,308 B2 | 3/2016 | Szegedy et al. |
| 10,410,121 B2 | 9/2019 | Husain |
| 10,565,473 B2* | 2/2020 | Tang .................... G06V 10/764 |
| 2018/0322371 A1* | 11/2018 | Dupont De Dinechin ................. G06V 10/454 |
| 2019/0258878 A1 | 8/2019 | Koivisto et al. |
| 2020/0311517 A1* | 10/2020 | Raichelgauz ........... G06T 11/20 |
| 2020/0410252 A1* | 12/2020 | Tsoi ......................... G06N 3/08 |
| 2021/0089841 A1* | 3/2021 | Mithun ..................... G06T 7/90 |

(Continued)

*Primary Examiner* — Sean T Motsinger
(74) *Attorney, Agent, or Firm* — Emily Drake; Eversheds Sutherland (US) LLP

(57) ABSTRACT

The disclosure is generally directed to systems and methods for inference quality determination of a deep neural network (DNN) without requiring ground truth information for use in driver-assisted vehicles, including receiving an image frame from a source; applying a normal inference DNN model to the image frame to produce a first inference with a first bounding box using a normal inference DNN model; applying a deep inference DNN model to a plurality of filtered versions of the image frame to produce a plurality of deep inferences with a plurality of bounding boxes; comparing the plurality of bounding boxes to identify a cluster condition of the plurality of bounding boxes; and determining an inference quality of the image frame of the normal inference DNN model as a function of the cluster condition.

20 Claims, 6 Drawing Sheets

(56) References Cited

U.S. PATENT DOCUMENTS

| | | | |
|---|---|---|---|
| 2022/0222477 A1* | 7/2022 | Shen | G06V 10/82 |
| 2022/0262093 A1* | 8/2022 | Zhou | G06V 10/255 |
| 2022/0318559 A1* | 10/2022 | Shen | G06N 20/00 |
| 2023/0050573 A1* | 2/2023 | Liu | G06V 10/7715 |
| 2023/0067322 A1* | 3/2023 | Ding | G01S 13/89 |
| 2023/0109712 A1* | 4/2023 | Romero | G06V 20/64 |
| | | | 382/181 |
| 2023/0186637 A1* | 6/2023 | Singh | G06N 3/045 |
| | | | 382/104 |

\* cited by examiner

SYSTEMS AND METHODS FOR DETECTING DEEP NEURAL NETWORK INFERENCE QUALITY USING IMAGE/DATA MANIPULATION WITHOUT GROUND TRUTH INFORMATION

FIELD OF THE DISCLOSURE

This disclosure generally relates to artificial intelligence using deep neural networks, and more particularly relates to systems and methods for detecting deep neural network (DNN) inference quality using image/data manipulation without ground truth information.

BACKGROUND

Self-driving cars rely on artificial intelligence to detect and respond within seconds to avoid an accident. Such artificial intelligence involves a deep neural network (DNN) composed of many layers of interconnected artificial "neurons." Training is the process of "teaching" a DNN to perform artificial intelligence for image identification for self-driving vehicles or semi-autonomous vehicles by feeding the DNN data to develop a trained deep learning model for prediction purposes. Errors are part of the training process to strengthen a DNN until accuracy is improved. For images, the inference process includes making a prediction, and performing an update based on the strength of interconnections so that a next same type of image presented to a DNN more likely performs more accurately. Once a DNN is trained, a model can make predictions through inference based on new images with accuracy. Inference is the process of using a trained DNN to make prediction based on images never before seen.

Typical DNN inference quality measurements are difficult to obtain because a typical DNN requires a large amount of ground truth information.

It is desirable to provide solutions that address the need for ground truth information for DNN quality measurements.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
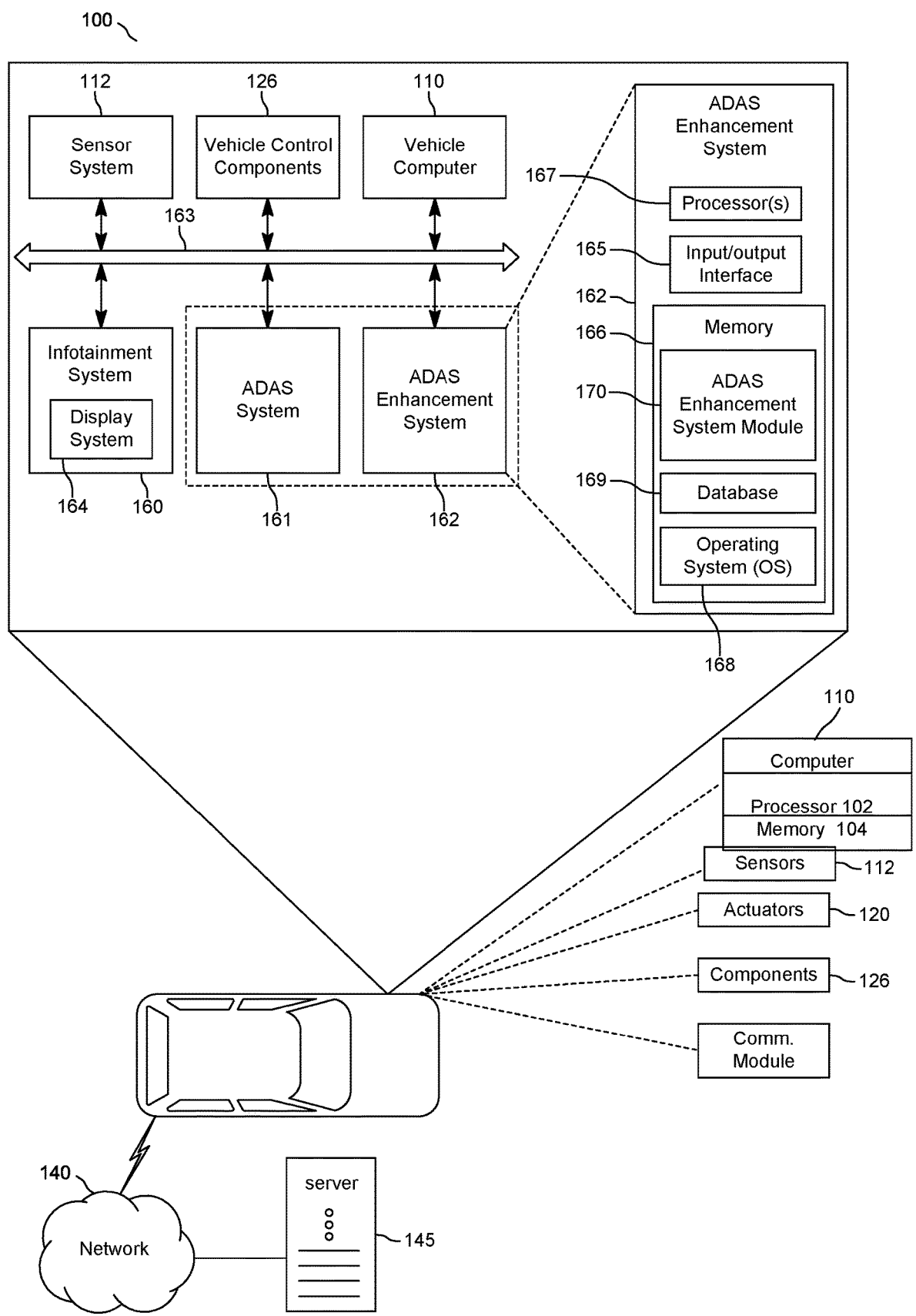
FIG. 1 illustrates an example system appropriate for a neural network implementation in accordance with an embodiment of the disclosure.

In terms of a general overview, this disclosure is generally directed to systems and methods for neural networks. More specifically, this disclosure is related to providing deep neural networks and determining an inference quality useful for application for different autonomous and semi-autonomous vehicle maneuvering and driving, such as valet parking, automatic parking, trailer back-up assistance, parking of trailers, collecting data, processing, and mapping.

Neural network data can be received over a network, such as "over the air" ("OTA") type data or collected using sensor and camera hardware on a vehicle. Prediction quality of images and inference quality cannot always be confirmed with ground truth data. Moreover, true ground truth data cannot be retrieved in a real-time scenario when a vehicle is moving. Thus, improvements in image prediction using neural networks are herein disclosed.

In one or more embodiments, a method for inference quality determination of a deep neural network (DNN) includes receiving an image frame from a source, applying a normal inference DNN model to the image frame to produce a first inference with a first bounding box using a normal inference DNN model, applying a deep inference DNN model to a plurality of filtered versions of the image frame to produce a plurality of deep inferences with a plurality of bounding boxes, comparing the plurality of bounding boxes to identify a cluster condition of the plurality of bounding boxes, and determining an inference quality of the image frame of the normal inference DNN model as a function of the cluster condition.

In one or more embodiments, the applying the deep inference DNN model to the plurality of filtered versions of the image frame to produce the plurality of deep inferences with the plurality of bounding boxes includes applying at least four filters to the image frame to produce at least four additional bounding boxes as the plurality of bounding boxes, the four filters including at least a zooming, an image brightening, an image sharpening, and a super-resolution filter.

In one or more embodiments, the applying the deep inference DNN model includes applying a deep inference DNN model with a deep backbone architecture.

In one or more embodiments, applying the deep inference DNN model to the plurality of filtered versions of the image frame to produce the plurality of deep inferences with the plurality of bounding boxes includes applying the deep inference DNN model produce the plurality of deep inferences with the plurality of bounding boxes including a plurality of x and y coordinates identifying corners of the plurality of bounding boxes and a plurality of bounding box areas.

In one or more embodiments, the comparing the plurality of bounding boxes to identify the cluster condition includes applying one or more of a clustering technique such as K-mean clustering, density-based spatial clustering (DB-SCAN), Gaussian mixture modeling type clustering to determine the cluster condition.

In one or more embodiments, the determining the inference quality of the image frame of the normal inference DNN model as a function of the cluster condition includes determining that the cluster condition is a convergence such that a single cluster condition indicates a positive inference quality.

In one or more embodiments, the determining the inference quality of the image frame of the normal inference DNN model as a function of the cluster condition includes determining that the cluster condition is a divergence such that a multiple cluster condition indicates a poor inference quality, which includes manually annotating the image frame when the cluster condition indicated the poor inference quality and transmitting the image frame from a vehicle to enable over-the-air updating of the DNN model.

In one or more embodiments, the method further includes iteratively repeating the determining the inference quality of the image frame of the inference DNN model with a second image frame from the source.

In other embodiments, a system and driver-assisted vehicle include a processor and a memory coupled to the processor that stores instructions, wherein the processor executes the instructions to apply a normal inference DNN model to the image frame to produce a first inference with a first bounding box, apply a very deep inference DNN model to a plurality of filtered versions of the image frame to produce a plurality of deep inferences with a plurality of bounding boxes, compare the plurality of bounding boxes to identify a cluster condition of the plurality of bounding boxes, and identify a second cluster condition between the plurality of bounding boxes with the first bounding box to determine an inference quality of the image frame of the normal inference DNN model.

In one or more embodiments, if the inference quality of the image frame of the normal inference DNN model is of poor quality, then the image frame is transmitted over a network to enable retraining of the normal inference DNN model. For example, the image data can be annotated manually/automatically via a tool and then used for retraining a normal DNN model.

In one or more embodiments, the determination of inference quality of the image frame is performed independent of ground truth information.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a nomadic device such as a smartphone, refers to code (software code, typically) that is installed in the nomadic device. The code may be launched and operated via a human-machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electrified vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving-related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations executed by the vehicle computer. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment events. The level of human intervention is very low. Level 5 (L5) vehicles are fully autonomous vehicles that do not involve human participation.

Although the present disclosure describes a vehicle system and a server, it is understood that any suitable computer system may be used to perform the techniques and/or the functionality of the adversarial neural network described herein. Additionally, the techniques described herein may include training a generator for image generating purposes, which can result in improved processing efficiencies within vehicle systems. For example one or more neural networks used within the vehicle systems may be trained to improve the performance of the neural networks.

FIG. 1 illustrates an example system 100 that includes a vehicle 101 that may be one of various types of vehicles such as a gasoline-powered vehicle, an electrified vehicle, a hybrid electrified vehicle, or an autonomous vehicle, that is configured as an automated or semi-automated vehicle. The vehicle 101 may be implemented in a variety of ways and can include some components that are a part of the vehicle 101, and, in some embodiments, other components that are accessible via a communications network 140. The components that can be a part of vehicle 101 can include computer 110 with a processor 102 and a memory 104 in communication with network 140. Memory 104 includes one or more forms of computer-readable media, and stores instructions executable by the computer 110 for performing various operations, including as disclosed herein.

The computer 110 may operate vehicle 101 in an autonomous, a semi-autonomous mode, or a non-autonomous (manual) mode. For purposes of this disclosure, an autonomous mode is defined as one in which each of vehicle 101 propulsion, braking, and steering are controlled by the computer 110; in a semi-autonomous mode the computer 110 controls one or two of vehicles 101 propulsion, braking, and steering; in a non-autonomous mode a human operator controls each of vehicle 101 propulsion, braking, and steering.

The computer 110 may include programming to operate one or more of vehicle 101 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

Computer 110 may include or be communicatively coupled to, e.g., via the vehicle 101 communications module 130 as described further below, more than one processor, e.g., included in electronic controller units (ECUs) or the like included in the vehicle 101 for monitoring and/or controlling various vehicle components 126, e.g., a powertrain controller, a brake controller, a steering controller, etc. Further, the computer 110 may communicate, via the vehicle 101 communications module 130, with a navigation system that uses the Global Position System (GPS). As an example, the computer 110 may request and receive location data of the vehicle 101. The location data may be in a known form, e.g., geo-coordinates (latitudinal and longitudinal coordinates).

The computer 110 is generally arranged for communications on the vehicle 101 communications module 130 and also with a vehicle 101 internal wired and/or wireless network, e.g., a bus or the like in the vehicle 101 such as a controller area network (CAN) or the like, and/or other wired and/or wireless mechanisms. Computer 110 may transmit messages to various devices in the vehicle 101 and/or receive messages from the various devices, e.g., vehicle sensors 112, actuators 120, vehicle components 126, a human-machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 112 may provide data to the computer 110.

Vehicle sensors 112 may include a variety of devices such as are known to provide data to the computer 110. For example, the vehicle sensors 112 may include Light Detection and Ranging (lidar) sensor(s) 112, etc., disposed on a top of the vehicle 101, behind a vehicle 101 front windshield, around the vehicle 101, etc., that provide relative locations, sizes, and shapes of objects and/or conditions surrounding the vehicle 101. As another example, one or more radar sensors 112 fixed to vehicle 101 bumpers may provide data to provide and range velocity of objects (possibly including second vehicles), etc., relative to the location of the vehicle 101. The vehicle sensors 112 may further include camera sensor(s) 112, e.g. front view, side view, rear view, etc., providing images from a field of view inside and/or outside the vehicle 101.

The vehicle 101 actuators 120 are implemented via circuits, chips, motors, or other electronic and or mechanical components that can actuate various vehicle subsystems in accordance with appropriate control signals as is known. The actuators 120 may be used to control components 126, including braking, acceleration, and steering of a vehicle 101.

In the context of the present disclosure, vehicle components 126 are one or more hardware components adapted to perform a mechanical or electro-mechanical function or operation, such as moving the vehicle 101, slowing or stopping the vehicle 101, steering the vehicle 101, etc. Non-limiting examples of components 126 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 140) a remote server 145. The communication module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communication module 130 include cellular, Bluetooth®, IEEE 802.11, dedicated short-range communications (DSRC), and/or wide area networks (WAN), including the Internet, providing data communication services.

The network 140 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 112 substantially continuously, periodically, and/or when instructed by a server 145, etc. Further, object classification or identification techniques can be used, e.g., in a computer 110 based on lidar sensor, camera sensor, etc., data, to identify a type of object, e.g., vehicle, person, rock, pothole, bicycle, motorcycle, etc., as well as physical features of objects.

The computer 110 may include programming to operate one or more of vehicle 101 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

FIG. 1 further shows some example components that can be included in the vehicle 101 in accordance with an embodiment of the disclosure. The example components can include a sensor system 112, vehicle control components 126, the vehicle computer 110, infotainment system 160, an Advanced Driver Assistance System (ADAS) 161, and an ADAS enhancement system 162. The various components are communicatively coupled to each other via one or more buses such as an example bus 163. The bus 163 may be implemented using various wired and/or wireless technologies. For example, the bus 163 can be a vehicle bus that uses a controller area network (CAN) bus protocol, a Media Oriented Systems Transport (MOST) bus protocol, and/or a CAN flexible data (CAN-FD) bus protocol. Some or all portions of the bus 163 may also be implemented using wireless technologies such as Bluetooth®, Bluetooth®, Ultra-Wideband, Wi-Fi, Zigbee®, or near-field-communications (NFC). The infotainment system 140 can include a display system 164 having a GUI for carrying out various operations. The GUI may be used, for example, by a driver to input a level of responsiveness for the ADAS 161 to perform an operation.

Sensor system 112 can include various types of sensors such as, for example, a weight sensor, the rear-facing camera, a radar detector, a front-facing camera, and others. Vehicle control components 126 can include various components and systems associated with driving functions of the vehicle 101 (such as, for example, the engine, brakes, accelerator, and fuel injection) and various other functions of the vehicle 101 (such as, for example, stocks and struts whose characteristics can be controlled for varying a performance of the vehicle 101). The various components may be controlled, activated, and/or operated by the vehicle computer 110, the ADAS 161, and the ADAS enhancement system 162.

In one implementation, the ADAS enhancement system 162 can be an independent device (enclosed in an enclosure, for example). In another implementation, some or all components of the ADAS enhancement system 162 can be housed, merged, or can share functionality, with the ADAS 161 and/or the vehicle computer 110. For example, an integrated unit that combines the functionality of the ADAS enhancement system 162 with that of the ADAS 161 can be operated by a single processor and a single memory device. In the illustrated example configuration, the ADAS enhancement system 162 includes a processor 167, an input/output interface 165, and a memory 166.

Input/output interface 165 may be configured to provide communications between the ADAS enhancement system 162 and other components such as the sensor system 112 (for receiving weight information from a weight sensor, for example), the vehicle control components 126 (for overriding commands issued by the ADAS 161 and for providing enhanced operations such as, for example, a greater braking distance), the infotainment system 160, and the ADAS 161.

Memory 166, which is one example of a non-transitory computer-readable medium, may be used to store an operating system (OS) 168, a database 169, and various code modules such as an ADAS enhancement system module 170. The code modules are provided in the form of computer-executable instructions that can be executed by the processor 167 for performing various operations in accordance with the disclosure.

The ADAS enhancement system module 170 may be executed by the processor 167 for performing various operations in accordance with the disclosure. Some example operations are described above.

Database 169 may be used to store information such as, for example, weight information related to the vehicle 101, braking distance information, responsiveness information, and road surface information, that can be accessed and used by the processor 164 when executing the ADAS enhancement system module 170.

Figure 2:
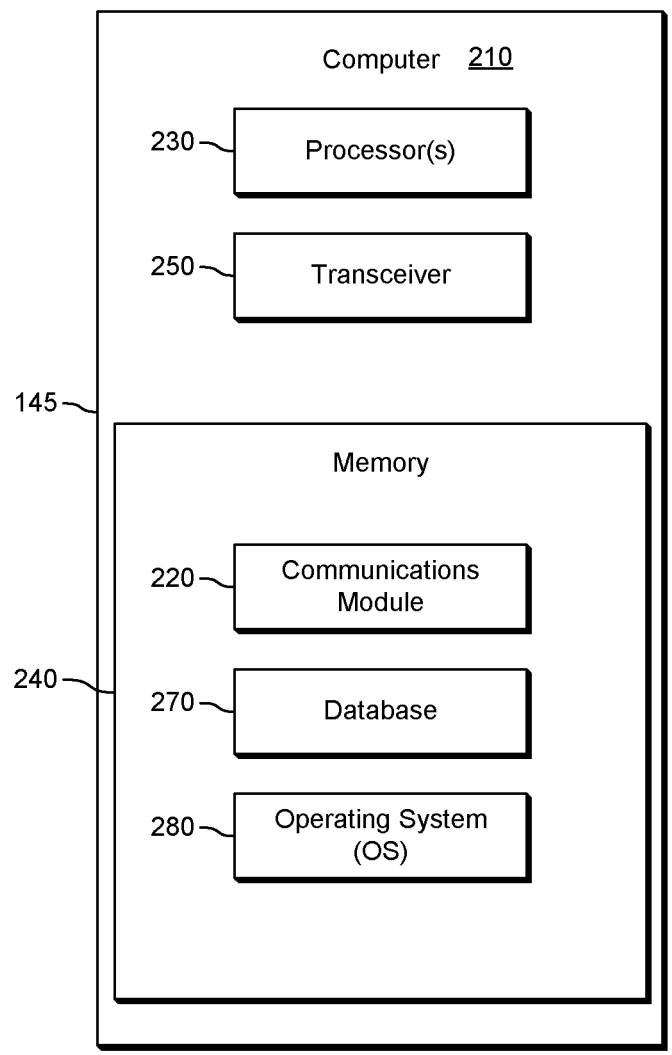
FIG. 2 illustrates a network system with some example functional blocks that may be included in a server accessible via a network or cloud in accordance with embodiments of the disclosure.

FIG. 2 is a block diagram of an example server 145. The server 145 includes a computer 210 and a communications module 220. The computer 210 includes a processor 230 and a memory 240. Server 145 also includes a transceiver 250 to enable network communications. The memory 240 includes one or more forms of computer-readable media, and stores instructions executable by the computer 210 for performing various operations, including as disclosed herein. The communications module 220 allows the computer 210 to communicate with other devices, such as the vehicle 101. Memory 240 also is shown including database 270 and an operating system (OS) 280.

Figure 3:
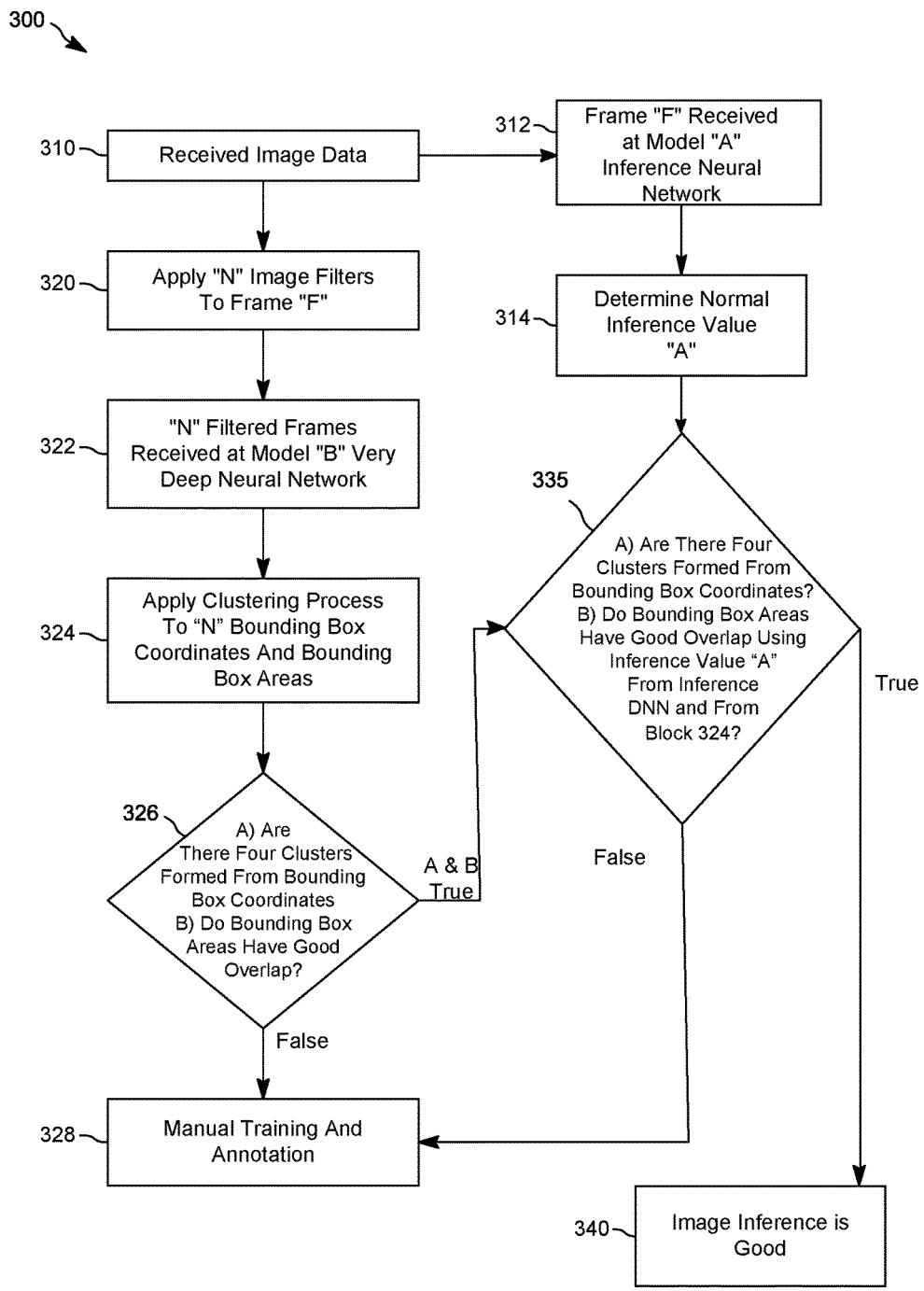
FIG. 3 illustrates a process diagram of a method in accordance with an embodiment of the disclosure.

Referring now to FIG. 3, a process flow diagram illustrates embodiments of the present disclosure. Specifically, FIG. 3 illustrates a system and method for detecting deep neural network inference quality using image/data manipulation without requiring ground truth information. Such methods are useful in predicting confidence measurements and automating training for deep neural network (DNN) processes and vehicle over-the-air ("OTA") updates. As one of ordinary skill in the art will appreciate with the benefit of the present disclosure, detecting image inference qualities typically requires ground truth information, and object detection inference quality is paramount for in-vehicle operations. As such, deep learning-based techniques apply to valet parking, trailer backup assist, and autonomous driving. However, detecting inference quality of object detection requires ground truth data and often the network training process is very iterative and manual. Therefore, deployment of commercial enhancements to autonomous and semi-autonomous vehicles requires reliable inference quality determinations.

Unfortunately, detecting objects with a DNN efficiently and accurately requires processing of a large amount of data and millions of images with accurate ground truth annotations. Such labeled ground truth data and inference is typically done on test data using ground truth information to determine the quality of network performance. Typically, ground truth information requires manual annotation of millions of images. If the network does not perform well on some of the data during inference quality determination, more data is collected, and a training process is iterated again using all the training data. One use of a deep neural network (DNN) is perceiving images and identifying objects. These perception features with a DNN inferencing engine may fail under certain situations, such as in vehicles that are operating autonomously. As one of skilled in the art will appreciate, there is a difficulty in collecting failed data and a difficulty in re-training DNN models in cloud networks. When failures occur, it is necessary to "reflash" or reboot the DNN model back to a vehicle using OTA updates for improved performance. However, in-vehicle data is difficult to obtain, annotate and train using a cloud network.

Referring to FIG. 3, a process flow diagram illustrates detecting Deep Neural Network (DNN) inference quality to predict a confidence in an inference using image and data locally manipulated outside of a network without requiring ground truth information. Importantly, process 300 illustrates automating an iterative DNN training process and vehicle OTA (Over-The-Air) model updates to reduce the amount of time and effort consumed in iterative training processes by minimizing manual efforts of image labelling and verification. At the completion of process 300, if a poor inference quality data is determined, for example, from vehicle 101, such data can be transmitted to a cloud network 140, labeled for re-training to enable a reflashing of an improved model to vehicle 101 via OTA transmissions.

As shown, process 300 is an iterative training process without manual input. Block 310 provides for receiving a new data image that is not annotated. Block 312 provides that a frame from the image "Frame F" is received at a first inference neural network, Model "A" which in one embodiment is normal-sized neural network inference training model. Block 314 provides for determining a normal inference value, A' which can include one or more of x and y coordinate determinations for Frame "F" and/or an area determination for image frame "F." For example, a normal inference model A may produce inference A' with bounding box with four coordinates (x,y). Block 335 checks a) if there are four clusters formed from bounding box coordinates; and b) whether bounding box areas gave good overlap using inference model value "A" from inferences DNN and from block 324, as explained in further detail below.

Block 320 provides for applying "n" image filters to the image frame "F." In one or more embodiments, "n" image filters includes applying at least three filters including a zoom filer, a brightness increment filter, a sharpness increment filter and a super-resolution filter to the image frame "F". For example, the zooming, image brightening and image sharpening, and super-resolution filters may apply to frame F to produce frame F', F", F''', and F''''.

Figure 4:
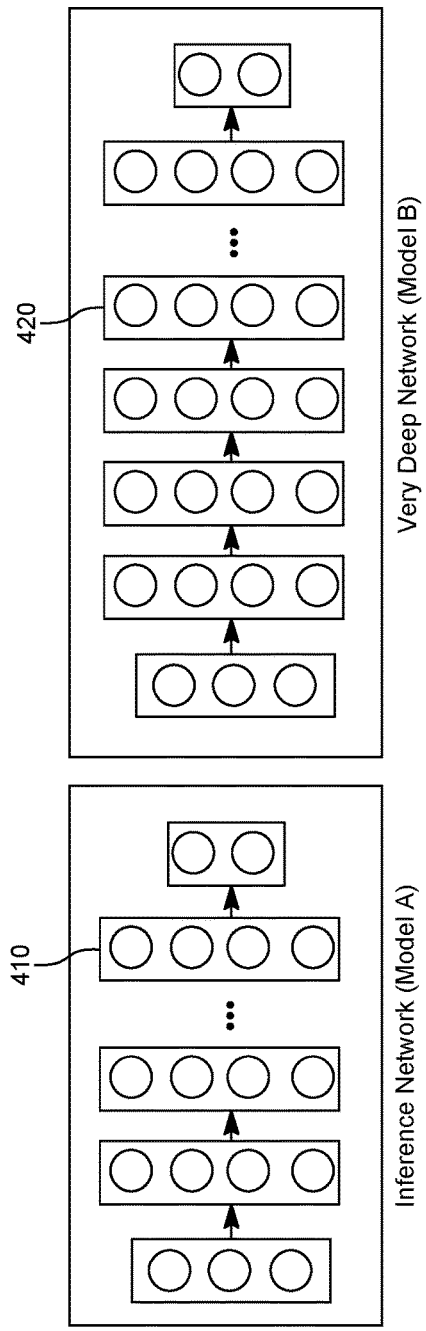
FIG. 4 illustrates sample inference neural network models in accordance with an embodiment of the disclosure.

Block 322 provides for applying a very deep neural network inference model "B" to the "n" filtered versions of Frame "F". For example, applying a very deep neural network to filtered frames, inferences B, B', B", B''', and B'''' with Bounding Box coordinates are produced. Referring to FIG. 4, two types of inference neural networks are shown. Model "A" 410 illustrates a normal inference neural network, and Model "B" 420 illustrates a very deep inference neural network. In block 324 a clustering process is applied to resulting bounding box coordinates (x,y) and bounding box area resulting from the very deep neural network at 322. Both Model A 410 and B 420 in one or more embodiment can share the same or similar architecture, however model B 420 may have a very heavy or deep backbone architecture.

Referring back to FIG. 3, the "n" filtered versions of image data are provided to decision block 326. In one or more embodiments, decision block 326 performs a logical operation between results of one or more clustering operations performed on the filtered image frame data. Thus, in block 326, image data B, B', B", B''', and B'''' x, y coordinates are compared after a clustering operation of 324. Specifically, block 326 asks a) are there four clusters formed from bounding box coordinates; and b) do bounding box areas have good overlap.

In one or more embodiments, the clustering operation may include K-mean clustering, DBSCAN clustering and/or Gaussian Mean M clustering to determine whether x, y coordinates are clustered in proximity. For example, if the top left (TL), top right (TR), bottom left (BL) and bottom right (BR) coordinates belong to four clusters (TLC, TRC, BLC, BRC), then the images can be considered converging and an inference is proper.

Figure 5:
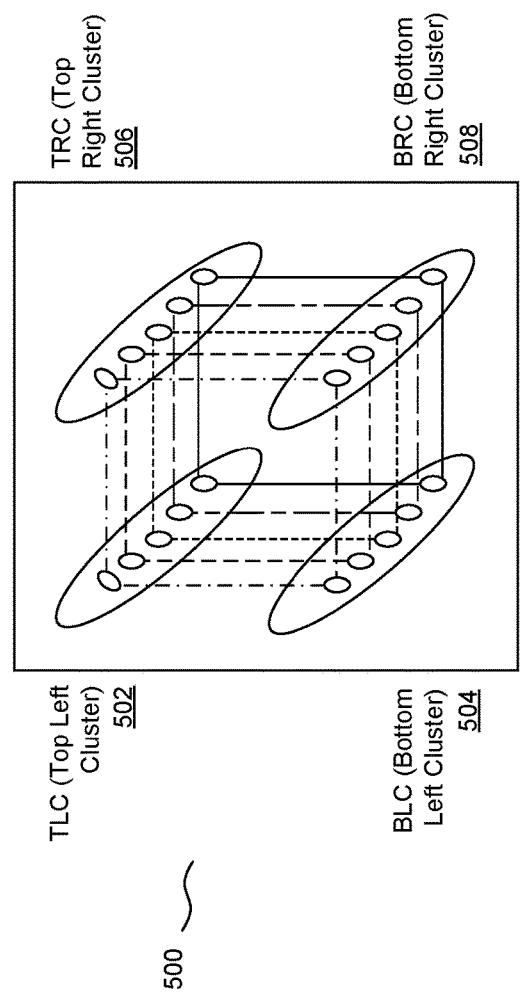
FIG. 5 illustrates sample bounding boxes with bounding area and coordinates in accordance with an embodiment of the disclosure.
Figure 6:
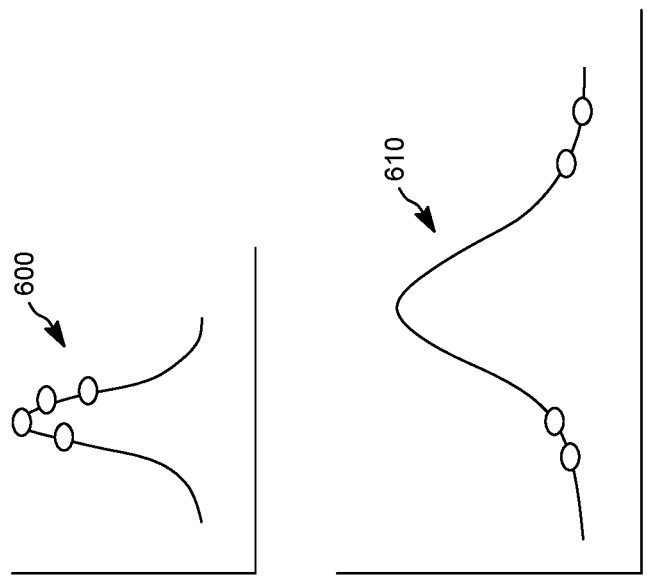
FIG. 6 illustrates results of applying a clustering process to bounding box coordinates in accordance with an embodiment of the disclosure.

Referring to FIG. 5, a clustering operation is illustrated. As shown, clustering of coordinates of image data 500 includes Top Left Cluster 502, Bottom Left Cluster 504, Top Right Cluster 506 and Bottom Right Cluster 508. If the corner coordinates form a cluster, FIG. 6 illustrates a cluster case 600 with bounding boxes that are similar or converging to the inference output resulting in an inference that is ranked "good". If the corner coordinates do not form a cluster, case 610 illustrates divergence to the inference output resulting in an inference that is ranked dissimilar to the inference output resulting in images requiring manual annotation.

Figure 7:
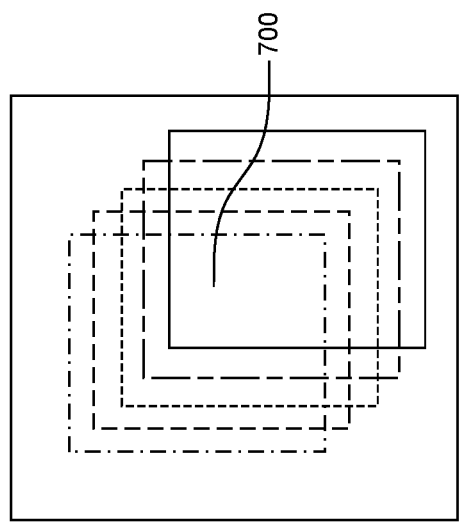
FIG. 7 illustrates bounding box area overlap results of applying a clustering process to in accordance with an embodiment of the disclosure.

Referring to FIG. 7, another clustering operation is illustrated. As shown clustering of bounding box areas using clustering operations such as applying one or more of K-mean clustering, density-based spatial clustering (DBSCAN), Gaussian mixture modelling type clustering in different areas which can be checked to determine whether the areas belong to the same cluster as shown in illustration 700. If an area of a bounding box overlaps, as illustrated by areas 700, a clustering condition is met. If there are no bounding box areas that overlap, or the overlap is insignificant, then a clustering condition is not met.

Referring back to FIG. 3, in one embodiment, bounding box coordinates from the filtered image data is compared with bounding box area data. In one or more embodiments, a logical ANDing operation between the clustered bounding data results in a determination at decision block 326 that the image data either converges or diverges. Thus, the image data from the filtered image data is enhanced to perturb the image data. One skilled in the art with the benefit of the present disclosure will appreciate that the logical operation can be any type of logical operation similar to an AND operation that can separate convergence from divergent clustering.

If decision block 326 provides a false result, process 300 continues to block 328 to indicate that manual training and annotation is required for the image. In other words, when bounding box coordinates and bound box area clustering processes result in convergence, then the clustered outputs are compared. If coordinates or/and area falls under multiple clusters process 300 concludes that the inference quality is poor and the image frame needs to be manually annotated and fed to a training set. In the case of an over-the-air (OTA) update, images from vehicle 101 may be sent to network 140, such as a cloud network, for annotation and model training so the trained model can be reflashed to vehicle 101 again.

If the answer to both a) and b) in block 326 is "true", the process continues to decision block 335, which provides for applying a logical operation to the clustered bounding box coordinates as compared to bounding box area data from the combined image data and filtered image data to determine if the data converges. This is done by applying clustering processes to the output from the normal neural network inference model and outputs from the deep neural network inference model as applied to the filtered and unfiltered image data. More particularly, the clustering operation performed between normal neural network inference model A inference A' is compared with results of cluster operations performed on the filtered image data from deep neural network model B. Thus, block 335 asks a) if there are four clusters formed from bounding box coordinates and b) do bounding box areas have good overlap using inference false "A" from inference DNN and from block 324. If the inference A coordinates and bounding box area falls in the same cluster from the filtered model B inference filtered image data, then the inference quality from the normal inference model A is "good" at block 340 and the data does not need to be added to the training set or sent for OTA updates, which would be a "false" and require block 328 for manual training and annotation.

For example, if a logical ANDing operation between the bounding box coordinates and the bounding area provides results that are true, block 340 provides that the image inference is a good one. If the logical operation results in a divergence or false result, then there is a divergence, and the process returns to block 328 for manual training and annotation. As shown, image filtering enhances image frame data, which is used to perturb the given image for the neural networks. When both the normal neural network models A, and the deep neural network model B give different results, process 300 identifies the image frame as failed and indicates that the neural network model A is failing which gives a measure of inference quality using clustering and area comparison.

Figure 8:
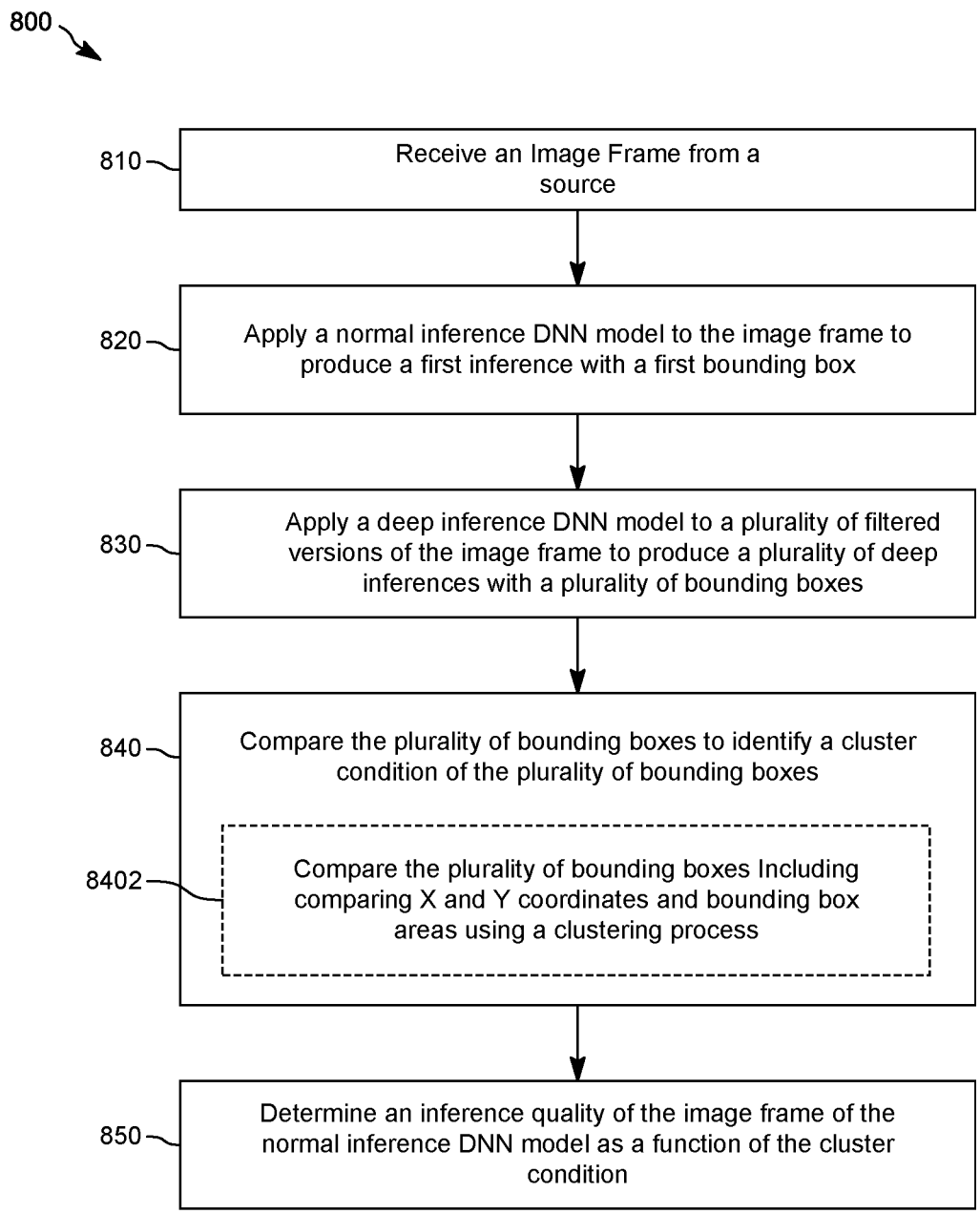
FIG. 8 illustrates a flow diagram illustrating a method in accordance with an embodiment of the disclosure.

Referring now to FIG. 8, a flow diagram illustrates a method 800 in accordance with one or more embodiments for inference quality determination of a deep neural network (DNN). Block 810 provides for receiving an image frame from a source. For example, referring to FIG. 1, vehicle 101 includes sensors 112 capable of collecting images and frames and can be a source for image frames during autonomous driving or driver-assisted driving or the like.

Block 820 provides for applying a normal inference DNN model to the image frame to produce a first inference with a first bounding box. For example, as shown in FIG. 4, normal neural network inference model "A" 410 produces a first inference as shown in FIG. 3 at block 312 and produces an inference at block 314.

Block 830 provides for applying a deep inference DNN model to a plurality of filtered versions of the image frame to produce a plurality of deep inferences with a plurality of bounding boxes. For example, as shown in block 320 a plurality of filters applied to an image frame generates a plurality of filtered versions of the image frame. A deep neural network, such as network 420 shown in FIG. 4, can be a very deep network model. In one or more embodiments the filtered versions of the image frame include a zoomed filter, a brightness increment filter, a sharpness filter and a super-resolution filter or more to generate perturbations of the image frame which are then applied to the deep inference DNN model 420.

Block 840 provides for comparing the plurality of bounding boxes to identify a cluster condition of the plurality of bounding boxes. For example, the plurality of bounding boxes can include x and y coordinates and bounding box areas associated with the image frame inferences generated after applying the image filtering. The cluster condition includes applying a clustering process to the filtered inferences generated by the deep inference DNN model.

Within block 840 is block 8402, which provides that the comparing the plurality of bounding boxes includes comparing x and y coordinates and bounding box areas using a clustering process. For example, in one or more embodiments, the bounding boxes are provided to a clustering process to identify bounding box corner coordinates and/or bounding box areas. The comparing, in one or more embodiments, may include applying K-mean clustering, density-based spatial clustering (DBSCAN), Gaussian mixture modelling type clustering and comparing the results of the clustering.

Block 850 provides for determining an inference quality of the image frame of the normal inference DNN model as a function of the cluster condition. For example, clustered results from a clustering process may be compared to determine whether the inference results from applying the deep inference DNN model and the inference results from the normal DNN model are in the same or different clusters.

Accordingly, the method determines which images to add to a training set or not during training and may apply to iterative DNN training processes to reduce the amount of time and effort needed to prepare data for iterative training by using a subset of the newly encountered data. As a result, commercially deployed DNN-based solutions benefit by continuously training inference neural network models over a network, such as a cloud network and by providing regular over-the-air (OTA) updates to vehicle 101. Thus, ground truth information may not be required, so inference quality detected without using ground truth and confidence of inferences can be predicted. Further, poor inference quality data from a vehicle 101 can be collected automatically to the cloud, labelled for re-training model and reflashed with improved models to vehicle 101 via OTA automatically.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, nomadic devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for inference quality determination of a deep neural network (DNN) comprising:
   receiving an image frame from a source;
   applying a normal inference DNN model to the image frame to produce a first inference with a first bounding box using a normal inference DNN model;
   applying a deep inference DNN model to a plurality of filtered versions of the image frame to produce a plurality of deep inferences with a plurality of bounding boxes;
   comparing the plurality of bounding boxes to identify a cluster condition of the plurality of bounding boxes; and
   determining an inference quality of the image frame of the normal inference DNN model as a function of the cluster condition.

2. The method of claim 1 wherein the applying the deep inference DNN model to the plurality of filtered versions of the image frame to produce the plurality of deep inferences with the plurality of bounding boxes comprises:
applying at least three filters to the image frame to produce at least three additional bounding boxes as the plurality of bounding boxes, the three filters including three or more of a zooming, an image brightening, an image sharpening, and a super-resolution filter.

3. The method of claim 1 wherein the applying the deep inference DNN model includes applying a deep inference DNN model with a deep backbone architecture.

4. The method of claim 1 wherein the applying the deep inference DNN model to the plurality of filtered versions of the image frame to produce the plurality of deep inferences with the plurality of bounding boxes comprises:
applying the deep inference DNN model produce the plurality of deep inferences with the plurality of bounding boxes including a plurality of x and y coordinates identifying corners of the plurality of bounding boxes and a plurality of bounding box areas.

5. The method of claim 1 wherein the comparing the plurality of bounding boxes to identify the cluster condition comprises:
applying one or more of K-mean clustering, density-based spatial clustering (DB SCAN), Gaussian mixture modeling type clustering to determine the cluster condition.

6. The method of claim 1 wherein the determining the inference quality of the image frame of the normal inference DNN model as a function of the cluster condition comprises:
determining that the cluster condition is a convergence such that a single cluster condition indicates a positive inference quality.

7. The method of claim 1 wherein the determining the inference quality of the image frame of the normal inference DNN model as a function of the cluster condition comprises:
determining that the cluster condition is a divergence such that a multiple cluster condition indicates a poor inference quality.

8. The method of claim 7 further comprising:
manually annotating the image frame when the cluster condition indicated the poor inference quality.

9. The method of claim 8 further comprising:
transmitting the image frame from a vehicle to enable over-the-air updating of the DNN model.

10. The method of claim 1 further comprising:
iteratively repeating the determining the inference quality of the image frame of the inference DNN model with a second image frame from the source.

11. An driver-assisted vehicle comprising:
a processor;
a memory coupled to the processor that stores instructions, wherein the processor executes the instructions to:
receive an image frame from a source via one or more sensors;
apply a normal inference DNN model to the image frame to produce a first inference with a first bounding box using a normal inference DNN model;
apply a deep inference DNN model to a plurality of filtered versions of the image frame to produce a plurality of deep inferences with a plurality of bounding boxes;
compare the plurality of bounding boxes to identify a cluster condition of the plurality of bounding boxes; and
determine an inference quality of the image frame of the normal inference DNN model as a function of the cluster condition.

12. The driver-assisted vehicle of claim 11 wherein the processor further executes the instructions to:
apply the deep inference DNN model to the plurality of filtered versions of the image frame to produce the plurality of deep inferences with the plurality of bounding boxes by applying at least four filters to the image frame to produce at least four additional bounding boxes as the plurality of bounding boxes, the four filters including at least a zooming, an image brightening, an image sharpening, and a super-resolution filter.

13. The driver-assisted vehicle of claim 11 wherein the processor further executes the instructions to:
apply the deep inference DNN model as a deep backbone architecture to produce the plurality of deep inferences with the plurality of bounding boxes including a plurality of x and y coordinates identifying corners of the plurality of bounding boxes and a plurality of bounding box areas.

14. The driver-assisted vehicle of claim 11 wherein the processor further executes the instructions to:
apply one or more of K-mean clustering, density-based spatial clustering (DBSCAN), Gaussian mixture modeling type clustering to determine the cluster condition.

15. The driver-assisted vehicle of claim 11 wherein the processor further executes the instructions to:
determine that the cluster condition is a convergence such that a single cluster condition indicates a positive inference quality.

16. The driver-assisted vehicle of claim 11 wherein the processor further executes the instructions to:
determine that the cluster condition is a divergence such that a multiple cluster condition indicates a poor inference quality; and
require manual training and annotation of the image frame.

17. The driver-assisted vehicle of claim 11 wherein the processor further executes the instructions to:
transmit the image frame from a vehicle to enable over-the-air updating of the DNN model.

18. A system for detecting deep neural network inference quality without ground truth information, comprising
a memory that stores computer-executable instructions; and
a processor configured to access the memory and execute the computer-executable instructions to:
receive an image frame;
apply a normal inference DNN model to the image frame to produce a first inference with a first bounding box;
apply a very deep inference DNN model to a plurality of filtered versions of the image frame to produce a plurality of deep inferences with a plurality of bounding boxes;
compare the plurality of bounding boxes to identify a cluster condition of the plurality of bounding boxes; and
identify a second cluster condition between the plurality of bounding boxes with the first bounding box to determine an inference quality of the image frame of the normal inference DNN model.

19. The system of claim 18 wherein if the inference quality of the image frame of the normal inference DNN model is of poor quality, the image frame is transmitted over a network to enable retraining of the normal inference DNN model.

20. The system of claim 18 wherein the determination of inference quality of the image frame is performed independent of ground truth information.

* * * * *